SEMICONDUCTOR BULK OSCILLATORS

Filed Dec. 15, 1965

INVENTORS
MARTIN M. ATALLA
ROBERT J. ARCHER
ROBERT D. HALL
REINHART W.H. ENGELMAN

BY A. C. Smith
ATTORNEY

United States Patent Office 3,422,289
Patented Jan. 14, 1969

3,422,289

SEMICONDUCTOR BULK OSCILLATORS

Martin M. Atalla and Robert J. Archer, Portola Valley, Robert D. Hall, Los Altos, and Reinhart W. H. Engelman, Palo Alto, Calif., assignors to Hewlett-Packard Company, Palo Alto, Calif., a corporation of California

Filed Dec. 15, 1965, Ser. No. 514,008
U.S. Cl. 307—299 3 Claims
Int. Cl. H03k 3/26, 19/08, 23/08, 23/22

ABSTRACT OF THE DISCLOSURE

A homogeneous body of semiconductor material which exhibits bulk negative resistance is coupled to an external circuit for operation as an oscillator in a mode which prevents the formation of high-field domains within the body.

The main object of the invention is to provide a tunable semiconductor oscillator which operates in a homogeneous bulk mode (negative resistance mode) rather than in the drifting field-domain mode commonly called the Ridley domain mode. A bulk material oscillator operating in the homogeneous bulk mode according to the present invention thus avoids the limitation on oscillation frequency imposed by domain drift through the length of material.

Figure 1:
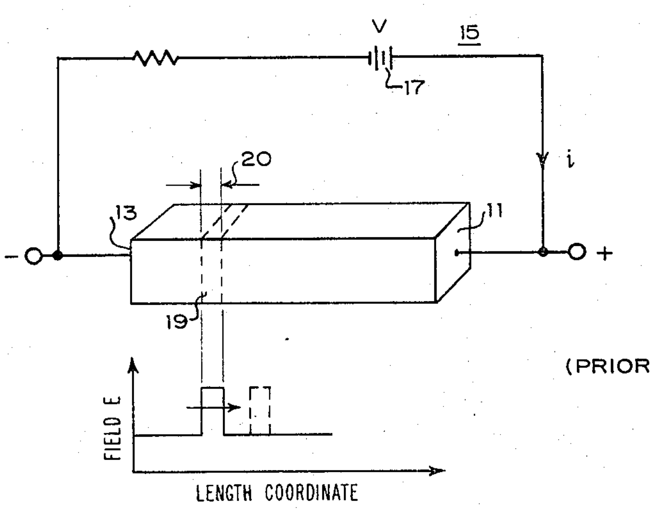
(PRIOR ART) Figure 1
Figure 2:
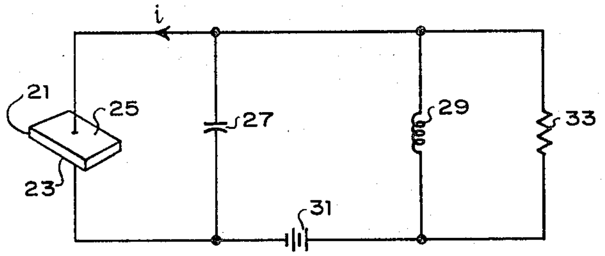
Figure 3:
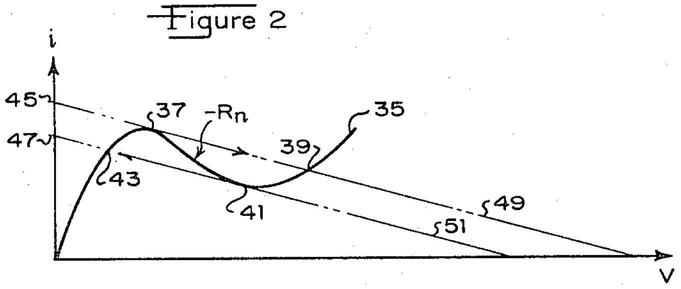

In accordance with the illustrated embodiment of the present invention, bulk material having a field-controlled negative conductivity region is operated as a result of its homogeneous bulk properties with a constant field over its entire length at any instant of time. The bulk material thus switches as a whole to the high field state rather than merely supporting a high field domain which propagates through the material, e.g. as in the reported Gunn effect. The operating frequency is thus independent of the length of the material and can be tuned by external means. Also the switching speed is merely limited by the negative conductance and dielectric constant of the material and may be typically as short as $10^{-13}$ seconds. In the drawing, FIGURES 1, 2, and 3 are, respectively, a schematic diagram and graph of the prior art Ridley domain-type oscillator (e.g. Gunn effect oscillator), a schematic diagram of the homogeneous bulk oscillator and external circuit according to the present invention, and a graph showing the operating characteristics of the homogeneous bulk oscillator of FIGURE 2. FIGURE 1 shows the reported Ridley domain-type operation in a body 9 of semiconductor material such as gallium arsenide having a low-field bulk resistivity $\rho$. Ohmic contacts 11, 13 at the opposite ends of body 9 are connected to an external circuit 15 including a source 17 of bias signal. At a selected potential V across the body 9, a high field domain 19 of low electrical conductivity develops across which part of the potential drop appears. This region drifts from one end of the body 9 to the other end while remaining portions of the material are in a highly conductive, low field state. This causes fluctuations in the current $i$ through the body as the high field region contacts an electrode and the repetition frequency of the fluctuation is defined by the propagation time or transit time through the body 9. Thus:

$$\text{Transit time}=L/V_d \qquad (1)$$

where $V_d$ is the domain drift velocity factor of the material and L is the length of the body 9. The operating frequency is thus defined substantially by the geometry of the body 9.

In the present invention, as shown in FIGURE 2, the field in the body 21 between electrodes 23, 25 is independent of the length coordinate at any instant of time during operation. Thus, propagation time of the high field region is eliminated and the bulk material oscillates as a whole between a high field state and a low field state, thereby attaining the properties of a homogeneous negative resistance. The minimum switching time between these states is related to the relaxation time of the electron population due to scattering by several known mechanisms (e.g. the Ridley-Watkins valley transfer mechanism) between the two conduction states of the electrons associated with the negative resistivity semiconductor material and is typically $10^{-13}$ seconds. The switching time is approximately equal to the product of capacitance C between electrodes 23, 25 and the negative resistance $R_N$ of the homogeneous bulk. It should be noted that $$C=\epsilon A/L \qquad (1)$$

and $$R_N=\rho_N L/A \qquad (2)$$

so that $$\text{Switching time}=\epsilon\rho_N \qquad (3)$$

or that the switching time is entirely independent of the geometry of the semiconductor body 21. Practical considerations such as space charge limited current effects, desired switching time, device capacitance, power handling capabilities and the like determine the length of the body 21.

In operation, an external biasing and frequency-determining circuit may be connected to the electrodes 23, 25, as shown in FIGURE 2. Capacitor 27 and inductor 29 represent a resonant structure which, of course, may in practice be a tuned cavity or length of transmission, or the like and source 31 supplies a level of bias signal to the body 21 sufficient to obtain a voltage-controlled negative resistance of the homogeneous bulk. For oscillatory operation according to this invention, the value of resistor 33 is selected equal to or larger than the negative resistance $R_N$ of the homogeneous bulk of the body 21. The oscillatory condition thus occurs as shown in FIGURE 3 about the dynamic characteristic curve 35 of the homogeneous material of body 21. As the signal across the body 21 increases, the current through it increases to the peak 37 and jumps abruptly within the switching time previously described to the value 39 on the high-voltage positive resistance portion of curve 35. The slope of the abrupt transition between points 37 and 39 is related to the equivalent load resistance 33 in the circuit. The operating point thus moves from point 39 on curve 35 to the valley point 41 as a result of current depletion in inductor 39 and insufficient source potential to maintain the current at level 39. Further decrease in the current causes the operating point to shift abruptly to point 43 on the low voltage positive resistance region of curve 35. Increase in current due to the source potential causes the operating point to shift from point 43 to the peak 37. The process is repetitive at a frequency determined by the total capacity of electrodes 23, 25 and capacitor 27 and the inductor 29 and may thus be controlled by varying at least one of the capacitor 27 and inductor 29. The total power output is approximately equal to the product of the average current value intercepts 45, 47 of load lines 49, 51 on the current axis of FIGURE 3 and the average voltage value intercepts of load lines 49, 51 projected onto the voltage axis. In actual operation utilizing the field controlled negative resistivity region as previously described in a 100 microns x 100 microns wafer of gallium arsenide having a thickness of about 90 microns and a low-field positive resistivity of about 10 ohm-centimeters, the device of the present invention operated in a tunable resonant cavity over the frequency range from about 600 megacycles to about 2000 megacycles in the ¼ wavelength resonant mode, from about 2100 megacycles to about 6200 megacycles in the ¾ wavelength resonant mode, and from about 3600 megacycles to about 6400 megacycles in the 5/4 wavelength resonant mode at a field level between 4500 and 6000 volts per centimeter. To operate the same wafer in the Ridley domain mode, the equivalent resistance of the external circuit is decreased to substantially less than the value of the negative resistance of the homogeneous bulk material and, in this mode, the Gunn frequency was fixed at about 1500 megacycles.

We claim:

1. Signalling apparatus comprising:

a homogeneous body of semiconductor material which operates with bulk negative resistance between opposite surfaces of the body with an electric field that is above a selected value of field intensity and that is substantially uniform through the body between the opposite surfaces thereof, and which operates with bulk positive resistance between the opposite surfaces of the body with an electric field that is below said selected value of field intensity and that is substantially uniform through the body between the opposite surfaces thereof;

ohmic contacts on said opposite surfaces of the body; and circuit means connected to said ohmic contacts for operation with said body to produce oscillatory signal, said circuit means including frequency-determining means for selecting the frequency of said oscillatory signal and including a bias source for supplying signal to said ohmic contacts to establish a bias electric field in said body which is above said selected value of field intensity and which is substantially uniform through said body, said circuit means having an equivalent resistance which is greater than the minimum value of the bulk negative resistance of said body.

2. Signalling apparatus as in claim 1 wherein:

said frequency-determining means selects the frequency of oscillatory signal at a frequency which is less than the critical maximum frequency that is related to the reciprocal of the time for the body to switch between positive resistance and negative resistance between the ohmic contacts.

3. Signalling apparatus as in claim 1 wherein said semiconductor material is gallium arsenide.

References Cited

Proc. IEEE, "Theory of the Gunn Effect," by Kroemer (A), vol. 52, p. 1736, December 1964.

Proc. IEEE, "External Negative Conductance of a Semiconductor with Negative Differential Mobility," by Kroemer (B), vol. 53, p. 1246, September 1965.

Proc. IEEE, "A New Mode of Operation for Bulk Negative Resistance Oscillators," by Copeland, pp. 1479–1480, October 1966.

IBM Journal, "Instabilities of Current in III–V Semiconductors, by Gunn, pp. 141, 145–147, April 1964.

JOHN W. HUCKERT, *Primary Examiner.*

J. D. CRAIG, *Assistant Examiner.*

U.S. Cl. X.R.

307—322; 317—234; 331—107